United States Patent
Foeller

(10) Patent No.: US 11,423,465 B2
(45) Date of Patent: Aug. 23, 2022

(54) SYSTEMS AND METHODS FOR FACILITATING AGRICULTURAL TRANSACTIONS

(71) Applicant: Masters Choice, Anna, IL (US)

(72) Inventor: Alex Foeller, Anna, IL (US)

(73) Assignee: Masters Choice, Anna, IL (US)

(*) Notice: Subject to any disclaimer, the term of this patent is extended or adjusted under 35 U.S.C. 154(b) by 0 days.

(21) Appl. No.: 16/734,673

(22) Filed: Jan. 6, 2020

(65) Prior Publication Data
US 2020/0219172 A1 Jul. 9, 2020

Related U.S. Application Data

(60) Provisional application No. 62/789,285, filed on Jan. 7, 2019.

(51) Int. Cl.
*G06Q 30/06* (2012.01)
*G06Q 10/08* (2012.01)

(52) U.S. Cl.
CPC ..... *G06Q 30/0635* (2013.01); *G06Q 10/0835* (2013.01); *G06Q 30/0617* (2013.01); *G06Q 30/0621* (2013.01)

(58) Field of Classification Search
CPC .......... G06Q 30/0635; G06Q 30/0617; G06Q 30/0621; G06Q 10/0835
USPC ................. 705/26.5, 26.81, 26.43
See application file for complete search history.

(56) References Cited

U.S. PATENT DOCUMENTS

| | | | | |
|---|---|---|---|---|
| 7,742,979 B2* | 6/2010 | Reding | ............... | G06Q 40/04 |
| | | | | 705/37 |
| 8,126,754 B1* | 2/2012 | Nakasu | ............... | G06Q 10/087 |
| | | | | 705/7.12 |
| 10,262,307 B2* | 4/2019 | Hansen | ................ | G06Q 40/08 |
| 11,010,767 B2* | 5/2021 | Pechenik | ......... | G06Q 30/0206 |
| 2001/0032165 A1* | 10/2001 | Friend | .................. | G06Q 40/04 |
| | | | | 705/37 |
| 2002/0023052 A1* | 2/2002 | Remley | ................ | G06Q 30/06 |
| | | | | 705/38 |
| 2002/0069156 A1* | 6/2002 | Adam | ................... | G06Q 30/06 |
| | | | | 705/37 |
| 2003/0216995 A1* | 11/2003 | DePauw | .............. | G06Q 40/04 |
| | | | | 705/37 |
| 2004/0093340 A1* | 5/2004 | Edmondson | ......... | G06Q 10/10 |
| 2012/0271730 A1* | 10/2012 | McNall | ................ | G06Q 30/06 |
| | | | | 705/26.4 |
| 2017/0332544 A1* | 11/2017 | Conrad | ................ | G06N 20/00 |

(Continued)

FOREIGN PATENT DOCUMENTS

| JP | 2014-R96055 | * | 10/2014 | ............ | G06Q 30/06 |
|---|---|---|---|---|---|
| KR | 101811640 B1 | * | 12/2017 | ............ | G06F 17/18 |
| WO | WO-2019032648 A1 | * | 2/2019 | ........... | A01B 79/005 |

OTHER PUBLICATIONS

Green, A. Technology Access is Ushering in Agriculture's 'Data Revolution'; published Sep. 2018 in Mechanical Engineering, 140, 20-21, Retrieved from Google database on Feb. 9, 2022.*

*Primary Examiner* — Yogesh C Garg

(74) *Attorney, Agent, or Firm* — Armstrong Teasdale LLP

(57) ABSTRACT

Described herein is a system that provides a computer-implemented means of connecting prospective producers and purchasers of an agricultural product, and facilitates a transaction between a matched producer and purchaser to arrange the production of the agricultural product by the producer and delivery to the purchaser.

15 Claims, 9 Drawing Sheets

(56) References Cited

U.S. PATENT DOCUMENTS

2019/0050948 A1\* 2/2019 Perry .................. G06V 20/188
2019/0325387 A1\* 10/2019 Perry ............... G08G 1/096805

\* cited by examiner

SYSTEMS AND METHODS FOR FACILITATING AGRICULTURAL TRANSACTIONS

This application claims the benefit of priority to U.S. Provisional Application Ser. No. 62/789,285, filed Jan. 7, 2019, the entire contents of which are hereby incorporated by reference herein.

FIELD OF THE DISCLOSURE

The present disclosure relates to a system that provides a computer-implemented means of connecting prospective producers and purchasers of an agricultural product, and facilitates a transaction between a matched producer and purchaser to arrange the production of the agricultural product by the producer and delivery to the purchaser.

BACKGROUND

Much of the production and sale of agricultural products is conducted in a commoditized marketplace in which a disconnect typically exists between producers of crops and purchasers of the crops. Producers of crops typically select a particular crop to grow based on the producer's best guess as to the marketability of the crop and the likelihood of producing the crop given the producer's growing conditions. Purchasers of crops typically purchase crops by selecting from the offerings from various wholesalers based on the best match of the characteristics of the crops, such as moisture content or protein/carbohydrate/oil content, with the needs of the purchaser.

Even among the same crop with similar characteristics, the purchaser's selected crops are increasingly fragmented according to end-product requirements, which may be categorized according to the plant's genome (i.e., GMO or non-GMO), or growing conditions (i.e., organic and conventional). Except in the case of large-scale purchasers with long-standing relationships with particular producers, purchasers rarely have opportunity to order a particular crop grown in a specific manner that is well-matched to the purchaser's requirements. Conversely, the producer typically operates with less than complete knowledge of any particular purchaser's requirements. Further, a producer may choose to underutilize the potential yield capacity of the available acreage rather than assume the risk of producing a crop that may not be profitable.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The following detailed description illustrates embodiments of the disclosure by way of example and not by way of limitation. The description enables one skilled in the art to make and use the disclosure. It also describes several embodiment, adaptations, variations, alternatives, and uses of the disclosure, including what is presently believed to be the best mode of carrying out the disclosure.

Embodiments of the present disclosure describe an agricultural transaction computing device and method implemented using a computing system that is in communication with a plurality of computing devices and data sources. The agricultural transaction computing system is configured to facilitate at least one transaction between at least one producer of an agricultural product and at least one purchaser of the agricultural product. In one example embodiment, a producer of an agricultural product including, but not limited to, a crop such as corn, soy, or wheat, is one party of the agricultural transaction, and is therefore referred to generally as a "producer" or a "grower." In this example embodiment, a purchaser of the agricultural product produced by the producer is a second party of the agricultural transaction, and is referred to generally as a "purchaser" or a "consumer."

Figure 1:
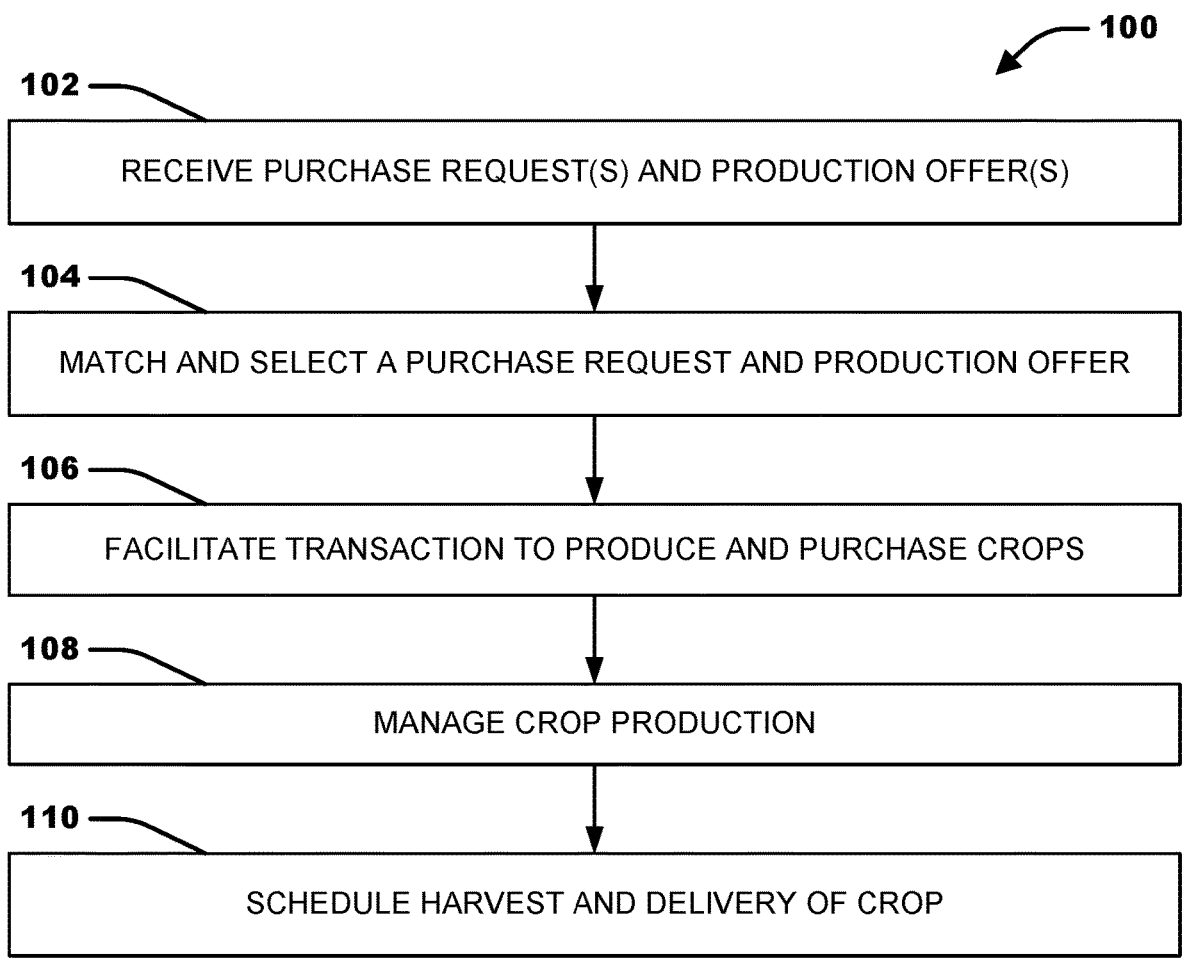
FIG. 1 is a flow chart illustrating a method for facilitating a transaction between at least one producer and at least one purchaser of an agricultural product.

As illustrated in FIG. 1, the agricultural transaction computing system receives at least one production offer from at least one computing system of a producer, referred to generally herein as a producer computing system, and at least one purchase request from at least one computing device of a purchaser, referred to generally herein as a producer computing device at FIG. 1. The agricultural transaction computing system compares the at least one purchase request and the at least one production offer and identifies a match between a selected purchaser and producer at 104 as described below. In various aspects, all producers and purchasers are anonymized within the agricultural transaction computing system as described below.

Referring again to FIG. 1, the agricultural transaction computing system further facilitates a transaction between the matched producer and purchaser at 106. In various aspects, the transaction is a contract for the purchaser to purchase crops grown by the producer as specified by the producer's purchase request as described below. In addition, the agricultural transaction computing device manages the production of the crop according to the agreement at 108 for various aspects of crop production including, but not limited to, planting, irrigation, fertilization, and harvest as described below. The agricultural transaction computing system production further manages additional aspects of the crop production by scheduling the harvest of the crop by the producer and the delivery of the crop to the purchaser at 110.

The systems and methods described herein include an agricultural transaction computing device (or server or computer system) for identifying and facilitating at least one transaction between at least one producer of an agricultural product and at least one purchaser of the agricultural product. The agricultural transaction server may further maintain a computing platform (an "agricultural transaction platform") such that the functionality of the agricultural transaction server is accessible to a user via a user computing device (e.g., a smart phone, laptop, etc.). The agricultural transaction server may provide results of the selected match at a graphical user interface (e.g., of an app) at the user computing device. The agricultural transaction server may include at least one processor in communication with a memory. In some embodiments, the memory may include one or more storage devices, including cloud storage devices, internal memory devices, non-centralized databases, and/or combinations thereof. The user computing device may also include at least one processor in communication with a memory, such as a mobile device.

In one exemplary embodiment, a user (e.g., a prospective producer or purchaser of an agricultural product) may access the agricultural transaction application or platform via a client application ("app") executed on a user computing device. The user computing device may include, for example, a mobile phone, a smart phone, a tablet, a laptop computer, other mobile device, etc. The user may additionally or alternatively access the agricultural transaction platform via a website accessed using a web browser on a user computing device.

The agricultural transaction platform is maintained by the agricultural transaction server (or computing device/system). The agricultural transaction server may be associated with a particular entity, such as an agricultural supply provider, a seed company, and/or any other party or combination of parties. In the example embodiment, the agricultural transaction server is associated with a seed company.

In addition, the agricultural transaction server may have access to data stored in one or more databases, referred to herein as "external" databases as such databases are external to the agricultural transaction server. External databases may collectively or individually be associated with and/or maintained by any particular entity, such as an agricultural supply provider, a seed company, and/or any other party or combination of parties. The agricultural transaction server may access data stored at an external database directly and/or through an API, which may be maintained by the agricultural transaction server and/or by the party associated with that particular external database. In the example embodiment, at least some of the data stored in an external database is encrypted, secured, or otherwise inaccessible to a general computing device such as a typical user computing device. The agricultural transaction server may include any suitable decryption or data-access components such that the agricultural transaction server may access the data stored in the external databases for processing and eventual presentment to the user.

Although the computer-implemented methods for facilitating an agricultural transaction are described herein as being performed by a single agricultural transaction server computing device, it should be understood that more than one computing device may perform the various actions and steps described herein as performed by the agricultural transaction server's computing device. In such cases, it should be understood that one or more agricultural transaction server computing devices may perform such analysis for a plurality of user computing devices, or, in other words, may be a centralized processing and/or analysis device. One agricultural transaction server computing device may service a plurality of user computing devices within one geographic location, and another agricultural transaction server computing device may service a plurality of user computing devices within another geographic location. Having at least one centralized agricultural transaction server computing device may facilitate increased data processing speeds, such that a user may manipulate user-input data and see the corresponding effects on the output data in substantially real-time. The centralized agricultural transaction server computing device may have more processing power than a user computing device, which may be unable to individually access, process, and/or analyze data.

Figure 2:
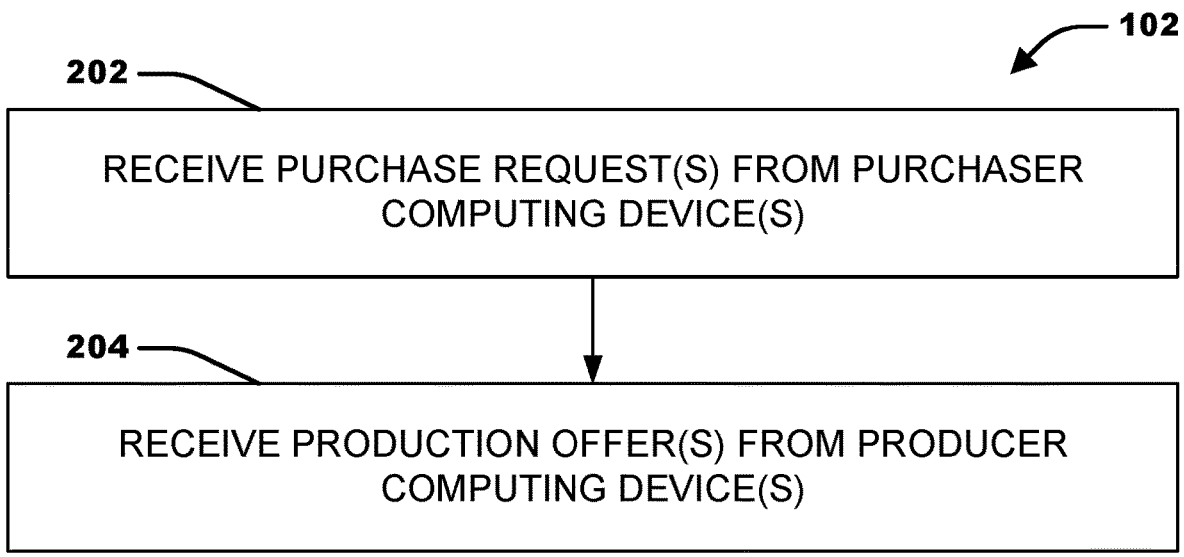
FIG. 2 is a flow chart illustrating receiving at least one purchase request and at least one production offer for an agricultural product.

Referring again to FIG. 1, the exemplary method 100 includes receiving purchase requests and productions offers at 102. Referring to FIG. 2, receiving purchase requests and productions offers at 102 may further include receiving at least one purchase request from at least one purchaser computing device at 202 and receiving at least one production offer from at least one producer computing device at 204. In certain embodiments, the method 100 is implemented using an agricultural transaction server computing device, as described herein.

In one exemplary embodiment of method 100, the agricultural transaction server receives user input at 102 from a user computing device. The user computing device may include any suitable user computing device, such as a smart phone, tablet, laptop computing device, desktop computing device, wearable computing device (e.g., "smart glasses," "smart watch," etc.), and/or any other user computing device. The agricultural transaction server may maintain an agricultural transaction analysis platform that is accessible to the user computing device via a software application ("app") and/or a web site.

The user input is inputted or provided to the user computing device by a prospective producer or purchaser of an agricultural product. For the purchase request, each potential purchaser may input a purchaser location, a delivery date, an amount of crop, a purchase price, a crop type, a growing condition, and at least one crop characteristic. In some aspects, the crop type includes, but is not limited to, a row crop seed, such as corn, soybeans, wheat, sorghum, cotton, rice, sunflowers, potatoes, and canola, as well as seeds for feedstuffs, such as triticale, alfalfa, and grasses. In other aspects, the crop type may be a particular brand or type of seed. In additional aspects, the crop type may be a classification of a crop type relating to the growing conditions or genome of the crop including, but not limited to, organic, conventional, GMO, and any other suitable classification. In other additional aspects, the growing condition of the purchase request may include a growing condition including, but not limited to, irrigation, soil type, soil chemistry, planting technique, type and amount of fertilizer, herbicide, and/or pesticide applied, harvest technique, etc. In various additional aspects, the purchase request may include at least one crop characteristic including, but not limited to, a seed moisture content, a seed mass, an ear size, a seed protein/carbohydrate/oil content, and any other suitable crop characteristic.

For the production offer, each potential producer may input parameters corresponding to the parameters of the purchase request including, but not limited to a producer location, a delivery date, an amount of crop, an acreage, a sale price, a crop type, a growing condition, and at least one crop characteristic. In this aspect, each potential producer may indicate a willingness or ability to achieve some of the parameters corresponding to the purchase request. By way of non-limiting example, a potential producer that is offering to cultivate additional acreage of an organic farm may be unwilling to raise a conventional crop on adjoining fields. In addition, each potential producer may input further parameters to define the production offer including, but not limited to, available agriculture equipment such as tractors, combines, and other suitable equipment for planting, raising, harvesting, storing, and/or transporting an agricultural product or crop.

In various aspects, the parameters defining the purchase request and the production offer may be accompanied by acceptable or achievable ranges for each parameter. By way of non-limiting example, a potential producer may indicate the ability to grow corn with a moisture content ranging from about 5% to about 20%, and a potential purchaser may indicate an acceptable moisture range of 10%-15%.

The user inputs received by the agricultural transaction server for the production offer and the purchase request may include a producer location and a purchaser location, respectively, as defined by a geographic area provide in any suitable format including, but not limited to, a ZIP code, a state or city designation, a "drawn" outline of an area on a graphical map, GPS coordinates with a radius therearound, and/or using any other method of designation.

In some embodiments, the parameters defining each users purchase request or production offer, and associated identity and correspondence data for each purchaser or producer, respectively, may be maintained as part of a user profile of the prospective purchasers and producers at the agricultural transaction platform. The user profile may include additional and/or alternative information, including log-in credentials, and/or other information such as financial or customer service ratings, and any other information relevant to facilitating an agricultural transaction. It is contemplated that certain elements of the user profile may be pre-existing or imported from a user profile maintained with an associated party. For instance, where the agricultural transaction server/platform is/are associated with a financial services provider or agricultural supplier, the prospective producer or purchaser may already have a profile (or account) with the provider or supplier, such that some of the information may already be available without the user having to input such information again. Moreover, it is contemplated that some information may be input to the user profile under the assistance of another entity, such as an agent or representative of a third-party entity, such as a seed supplier, and need not be directly input by user into the user computing device to be considered "provided by" or "input by" the user.

Figure 3:
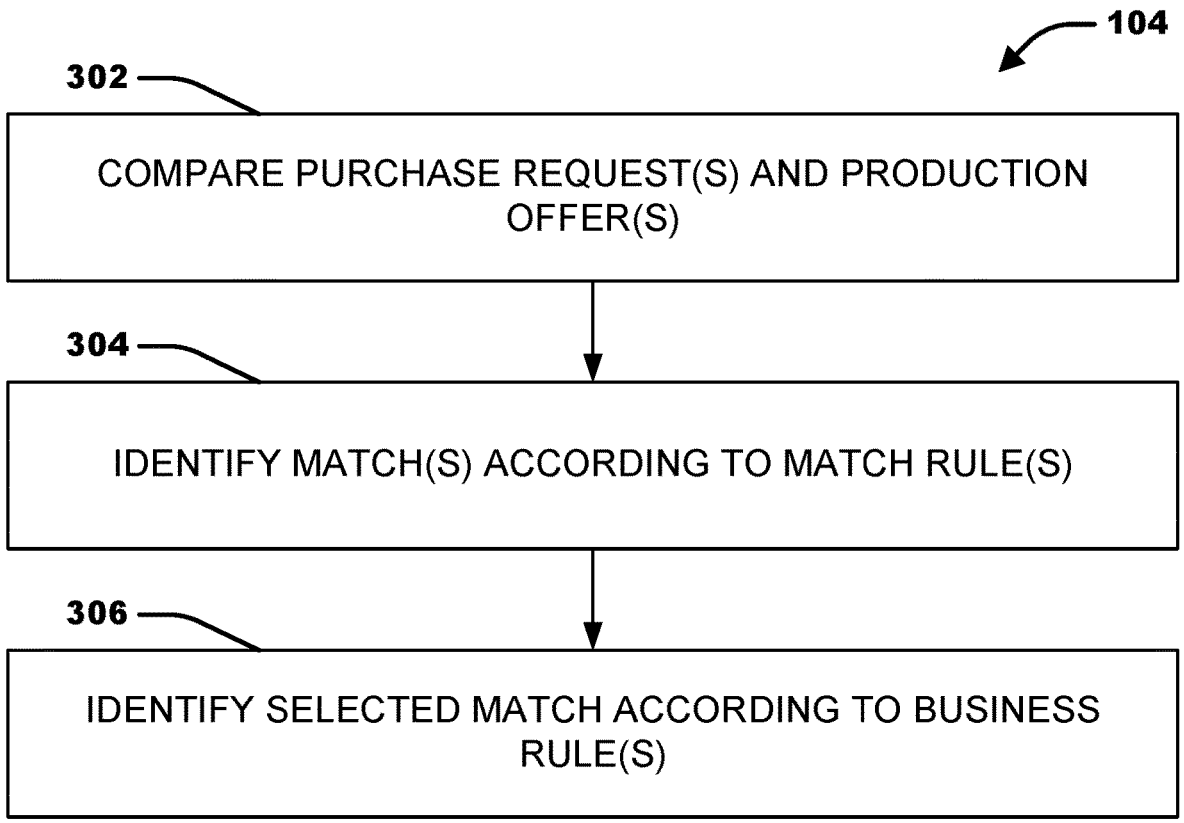
FIG. 3 is a flow chart illustrating matching and selecting a purchaser and a producer for facilitating a transaction for an agricultural product.

Referring again to FIG. 1, the method 100 includes matching and selecting a purchase request and production offer at 104. As illustrated in FIG. 3, the matching and selecting of the purchase request and production offer at 104 includes comparing the at least one purchase request and the at least one production offer at 302. In some aspects, this comparison includes identifying whether each parameter defining each purchase request has a corresponding parameter defined within each production offer. In various aspects, matching and selecting at 104 further includes identifying one or more matches according to at least one match rule at 304, as illustrated in FIG. 3.

In various aspects, the one or more match rules provide a framework or hierarchy of comparisons of the corresponding parameters defining the production offers and the purchase requests to identify a producer-purchaser pair that is likely to have a successful transaction. In one aspect, the at least one match rule includes determining a match if the producer and purchaser are located in suitably close proximity to enable the transportation and delivery of the crop produced by the producer to the purchaser in a useable condition. In another aspect, the at least one match rule includes determining a match if the purchase price input by the purchaser is greater than the sale price input by the producer, to ensure that both parties achieve a suitable financial outcome, and to provide for a suitable margin, defined herein as a difference between the purchase price and the sale price, in which the margin is suitable to achieve the financial objectives of the user operating the agricultural transaction server. In at least one other aspect, the at least one match rule includes determining a match if the producer and/or seller expressed any degree of flexibility in the planting, harvest, and/or delivery dates. In other aspects, the at least one match rule includes determining a match if there is overlap in the acceptable ranges of the various parameters characterizing the crops and the growing conditions of the crops. In another additional aspect, the at least one match rule includes determining a match if both producer and purchaser possess acceptable financial and customer satisfaction histories.

Referring again to FIG. 3, the matching and selection at 104 further includes identifying a selected match according to at least one business rule. In one aspect, the at least one business rule is provided to ensure that the production contract is fulfilled to conclusion, and that the user operating the agricultural transaction server at least partially maximizes the margin associated with the production contract. In one aspect, the at least one business rule includes confirming that both producer and purchaser possess sufficiently satisfactory financial records, customer satisfaction records, and/or active commercial relationships with seed suppliers and other parties necessary to provide the necessary supplies to the grower.

Figure 4:
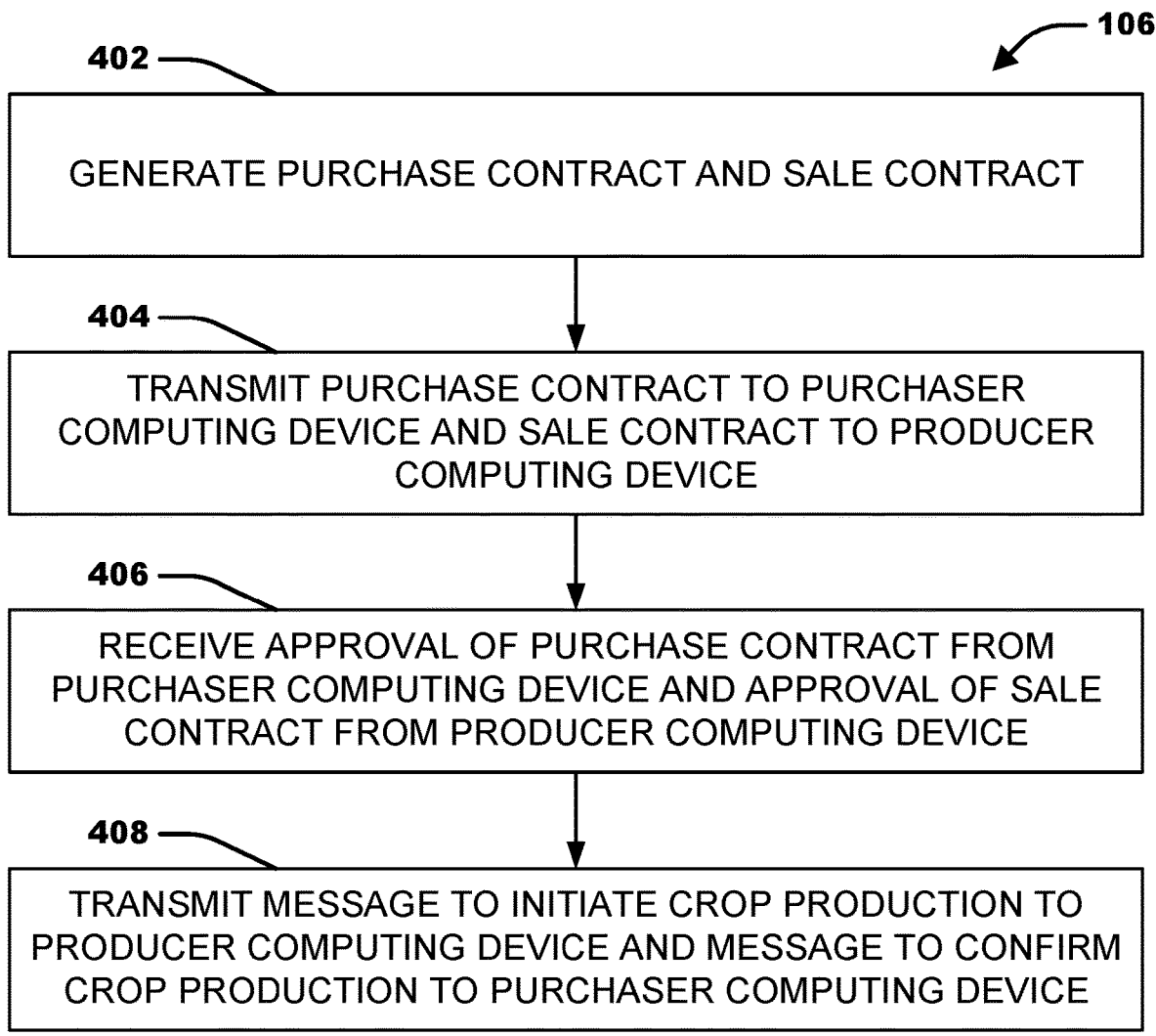
FIG. 4 is a flow chart illustrating facilitating a transaction between a selected purchaser and producer of an agricultural product.

Referring again to FIG. 1, the method 100 further includes facilitating the transaction to produce and purchase crops at 106. As illustrated in FIG. 4, facilitating the transaction at 106 further includes generating a purchase contract for the purchaser and a sale contract for the seller at 402. As described previously, the method 100 includes anonymizing both the purchaser and the producer to one another, necessitating separate purchase and sale contracts. In various aspects, the purchase and sale contracts are written in a manner consistent with standard agricultural industry rules and practices. In one aspect, the sale contract may request confirmation of various milestones during the production of the crop, irrigation and/or treatment with fertilizers, herbicides and pesticides during active growth, acceptable crop characteristics at harvest and delivery, the total amount of crop to be delivered, and the delivery date. In some aspects, the sale contract may provide for staged partial payments, such as an initial deposit to the producer, as well as progress payments tied to achieving certain milestones. In various additional aspects, the sale contract may provide for fines, penalties, contingency plans, or other negative incentives associated with the failure to meet all parameters of the sale agreement, such as a delivery date falling out of the purchaser's acceptable range. In other aspects, the purchase contract may request periodic reports, updates, data, images, and or in-person inspections to monitor crop growth and health as described below. In addition, the purchase contract may further include provide for fines, penalties, contingency plans, or other negative incentives associated with the failure to provide partial payments according to the payment and incentive schedule provided for in the purchase contract.

In various aspects, the generation of the purchase and sale contracts at 402 may include communication between the user of the agricultural transaction platform (i.e. the facilitator) and the producer and/or purchaser to resolve any slight mismatches between the parameters defining the purchase order and the production offer. In some aspects, the method 100 may include generating and sending a query to the purchaser and/or producer suggesting a compromise with respect to the parameters defining the purchase request and the production offer so as to proceed to generate the purchase and sale contracts at 402. In some aspects, this communication may be enabled using an e-mail, telephone call, and/or or in-person visit.

Referring again to FIG. 4, the facilitating the transaction at 106 further includes transmitting the purchase contract to the purchaser computing device and transmitting the sale contract to the producer computing device at 404. Further, the facilitating of the transaction at 106 further includes receiving approval for the purchase and sales contracts from the purchaser and producer computing devices at 406, and transmitting a message to the producer and purchaser to initiate crop production at 408.

Figure 5:
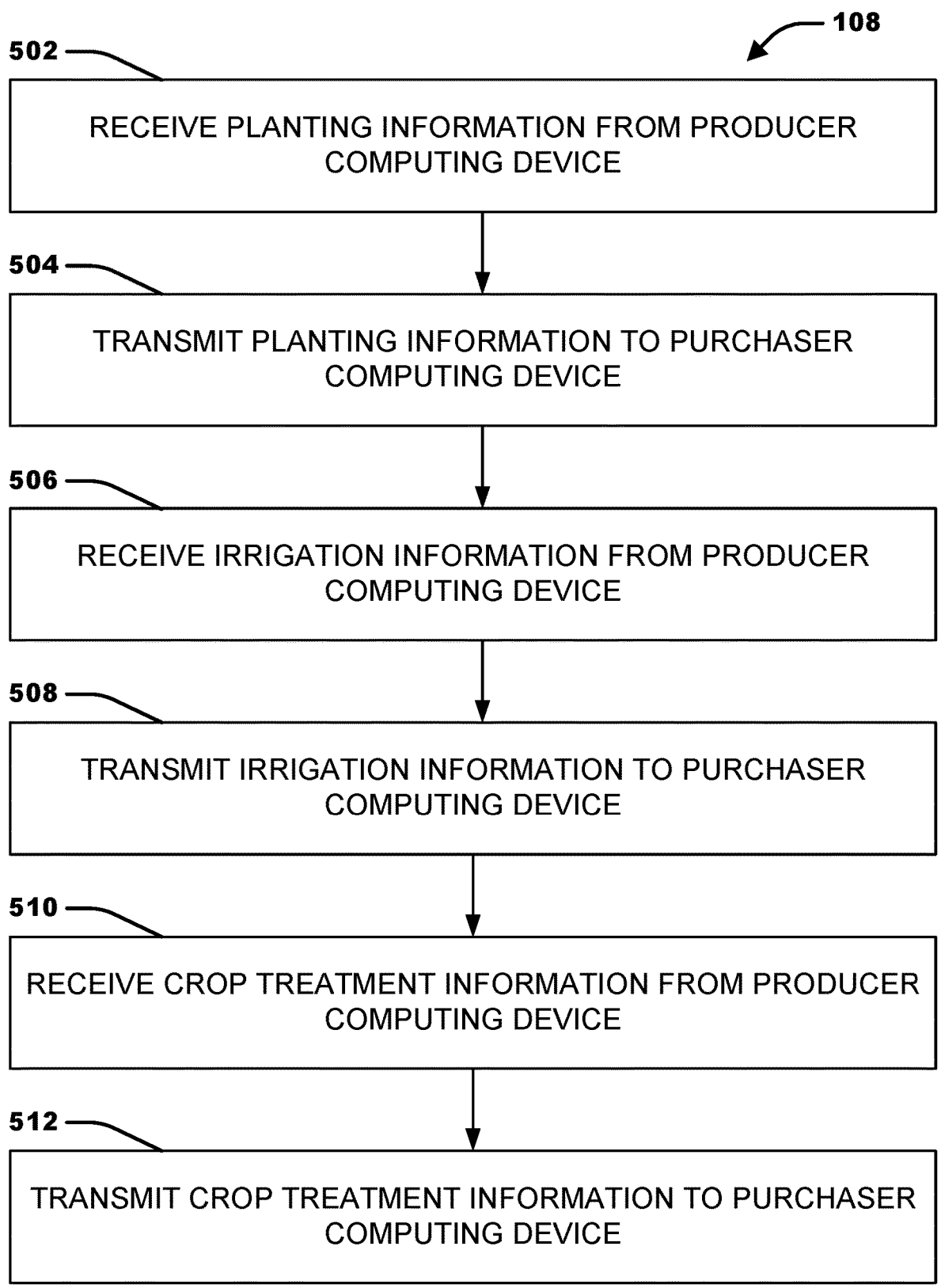
FIG. 5 is a flow chart illustrating managing production of an agricultural product.

Referring again to FIG. 1, the method further includes managing crop production at 108. Managing the crop production at 108 includes obtaining data characterizing the crop production at different stages from the producer and forwarding these data to the purchaser to confirm that crop production is proceeding in accordance with the purchase contract. Referring to FIG. 5, the agricultural transaction computing device receives information associated with the initial planting of the crop from the producer computing device at 502 and transmits this information to the purchaser computing device at 504. The information associated with the initial planting may include photographs of the seed bags or an in-person tour of the planted fields, as well as data transmitted from a third-party agricultural management application, such as Precision Planting or Farmlogs.

FIG. 5 also includes receiving information associated with the irrigation of the crops from the producer computing device at 506 and transmitting this information to the purchaser computing device at 508. Further, FIG. 5 includes receiving information associated with the treatment of the crops with at least one of a fertilizer, pesticide, or herbicide from the producer computing device at 510 and transmitting this information to the purchaser computing device at 512. In various aspects, the received and transmitted information is obtained in a manner similar to the information associated with the initial planting, as described above.

Figure 6:
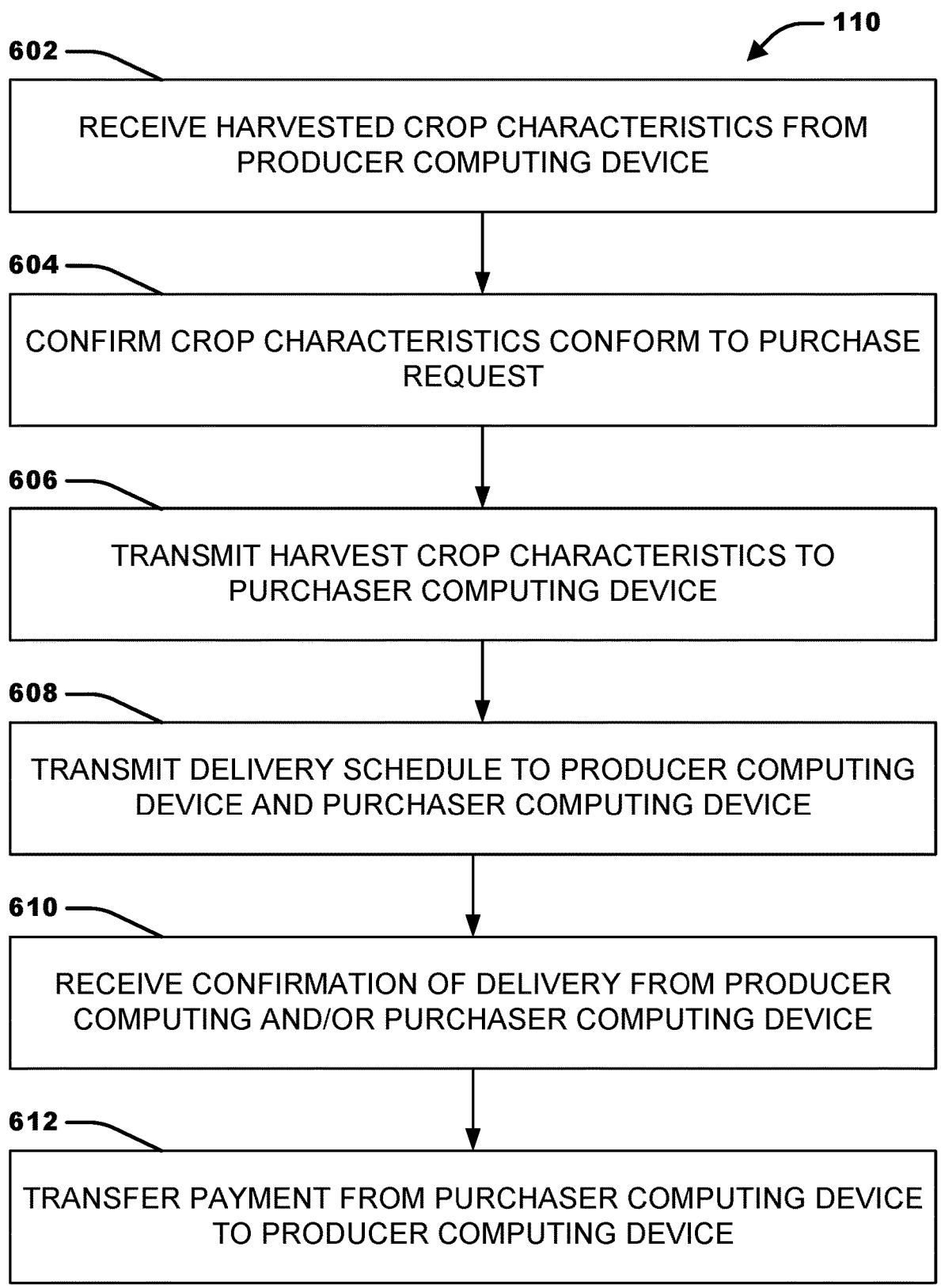
FIG. 6 is a flow chart illustrating scheduling harvest of the agricultural product by the producer and delivery of the agricultural product to the purchaser.

Referring again to FIG. 1, the method further includes scheduling the harvest of the crop by the producer and delivering the crop to the purchaser at 110. As illustrated in FIG. 6, the agricultural transaction computing device receives the harvested crop characteristics from the producer at 602, the harvested crop characteristics are confirmed by the agricultural transaction computing device to fall within acceptable ranges as defined by the purchase and sale contracts at 604, and the harvested crop characteristics are transmitted to the purchaser computing system at 606. A delivery schedule is transmitted to the producer and purchaser computing devices at 608, and confirmation of the delivery of crops with acceptable crop characteristics by the producer to the purchaser is confirmed at 610. Once delivery is confirmed at 612, the agricultural transaction computing device may transfer the remaining balance of payment from the purchaser's account to the producer's account at 612. As before, it is anticipated that the user of the agricultural transaction computing device may intervene to negotiate a satisfactory settlement of the contract by e-mail, phone, and/or in-person visit as needed in various aspects.

Figure 7:
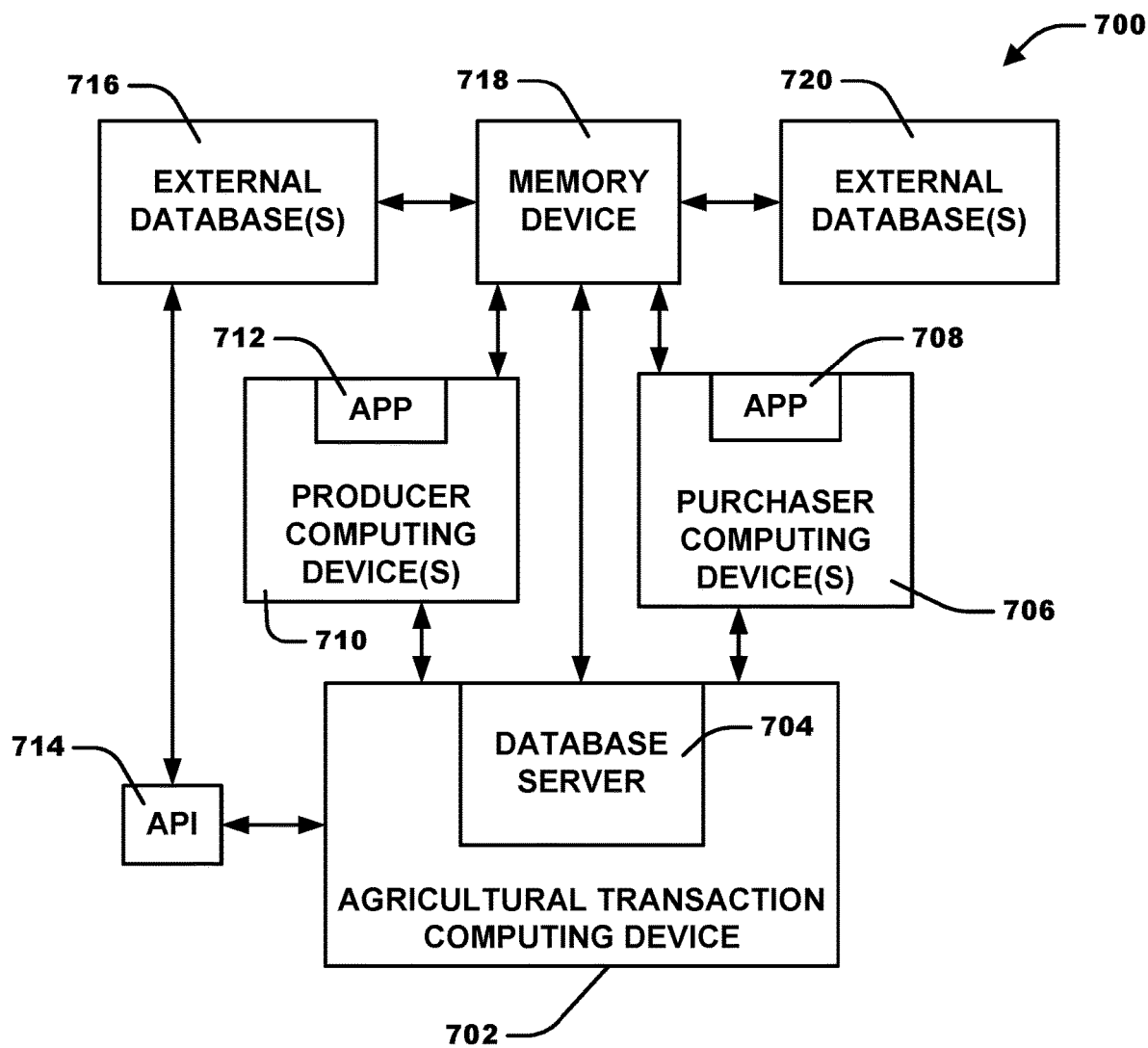
FIG. 7 is a simplified block diagram of an exemplary agricultural transaction system that may be used to implement the methods shown in FIGS. 1-6.

FIG. 7 depicts a schematic diagram of an exemplary agricultural transaction system 700. The agricultural transaction system 700 is configured to facilitate transactions between a producer and a purchaser of an agricultural product including, but not limited to, a crop. In one exemplary embodiment, an agricultural transaction computing system 700 may include and/or facilitate communication between one or more producer computing devices (each associated with a respective user or prospective crop producer, not shown) 710, one or more purchaser computing devices 706 (each associated with a user or prospective purchaser of a crop, not shown), a memory device 718, and one or more external databases 716/720.

The agricultural transaction computing device 702 may be any device capable of interconnecting to the Internet, including a server computing device, a mobile computing device, or other web-connectable equipment or mobile devices. Components of the agricultural transaction system 700 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

Additionally, a database server 704 may be connected to the memory device 718 containing information on a variety of matters. For example, the memory device 718 may include, but is not limited to, such information as previously accessed information or information previously entered by the producers and/or purchasers and characterizing the purchase request, the production offer, the sale contract, the crop production process, the delivery date and location, and payment information. The memory device 718 may further store parameters used to implement the methods of facilitating an agricultural transaction as described above including, but not limited to, the match rules used to identify matches between potential producers and potential sellers and the business rules used to identify a selected match between a selected producer and a selected seller as described above. In addition, the memory device 718 may store decryption keys, encryption keys, security credentials for accessing any of external databases 716/720, user profiles, user input, and/or any other information used, received, and/or generated by agricultural transaction system 700, as described herein. In one exemplary embodiment, the memory device 718 may include a cloud storage device, such that information stored thereon may be accessed by one or more components of agricultural transaction system 700, such as, for example, agricultural transaction computing device 702 and associated database server 704. In one embodiment, the memory device 371804 may be stored on the agricultural transaction computing device 702. In any alternative embodiment, the memory device 718 may be stored remotely from the agricultural transaction computing device 702 and may be non-centralized.

The agricultural transaction computing device 702 may be in communication with one or more producer computing devices 710 and with one or more purchaser computing devices 706, such as via wireless communication or data transmission over one or more radio frequency links or wireless communication channels. In the exemplary embodiment, the one or more producer computing devices 710 and the one or more purchaser computing devices 706 may be computers that include a web browser or a software application to enable the agricultural transaction computing device 702 to access the one or more producer computing devices 710 and the one or more purchaser computing devices 706, and vice versa, using the Internet or a direct connection, such as a cellular network connection. More specifically, the one or more producer computing devices 710 and the one or more purchaser computing devices 706 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. The one or more producer computing devices 710 and the one or more purchaser computing devices 706 may be any device capable of accessing the Internet including, but not limited to, a desktop computer, a mobile device (e.g., a laptop computer, a personal digital assistant (PDA), a cellular phone, a smartphone, a tablet, a phablet, netbook, notebook, smart watches or bracelets, smart glasses, wearable electronics, pagers, etc.), or other web-based connectable equipment. Additionally, the one or more producer computing devices 710 and the one or more purchaser computing devices 706 may be communicatively coupled to the agricultural transaction computing device 702 through many interfaces including, but not limited to, a direct cable connection, a Bluetooth® connection, and a Wi-Fi connection.

In some embodiments, agricultural transaction computing device 702 may be associated with a software provider, and/or any other entity or entities. The agricultural transaction computing device 702 is configured to maintain an agricultural transaction facilitation platform (not specifically shown) accessible to a user via a software application ("app") 708/712 on their computing devices 706/710. It should be readily understood that the agricultural transaction facilitation platform may be accessible via a web browser on the one or more producer computing devices 710 and the one or more purchaser computing devices 706 that references to an app 708/712 in a non-limiting manner. Users, such as prospective producers and prospective purchasers, may register or sign up with the agricultural transaction facilitation platform to access the agricultural transaction facilitation services of the agricultural transaction computing device 702.

External databases 716/720 may be associated with separate, distinct entities and/or may all be associated with one entity. In the illustrated embodiment, external databases 716/720 include a first external database 720 that maintains and stores a list of available production offers, purchase requests, and associated information. The external databases 716/720 may further include a second external database 716 associated with a third-party provider or a platform to provide a variety of features including, but not limited to, mapping features using providers such as Mapquest, Google Maps, or other map providers, financial features using providers such as John Deere Financial or Amber Road, and agricultural management features using providers such as Farmlogs or Precision Planting.

The agricultural transaction computing device 702 may be in direct communication with external databases 720 and/or may be in indirect communication with external databases 716 (e.g., via an Application Programming Interface (API) 714). In the example embodiment, at least one of external database 716 stores data in an encrypted format, for instance, because the stored data includes personally identifiable information or other sensitive information. The agricultural transaction computing device 702, as described herein, may store and use security credentials that enable access to the encrypted or otherwise secured data. The agricultural transaction computing device 702 is configured to anonymize, aggregate, and/or otherwise "sanitize" any secured data before presenting data to any user, such that the data may be mined and processed but data security is maintained.

Figure 8:
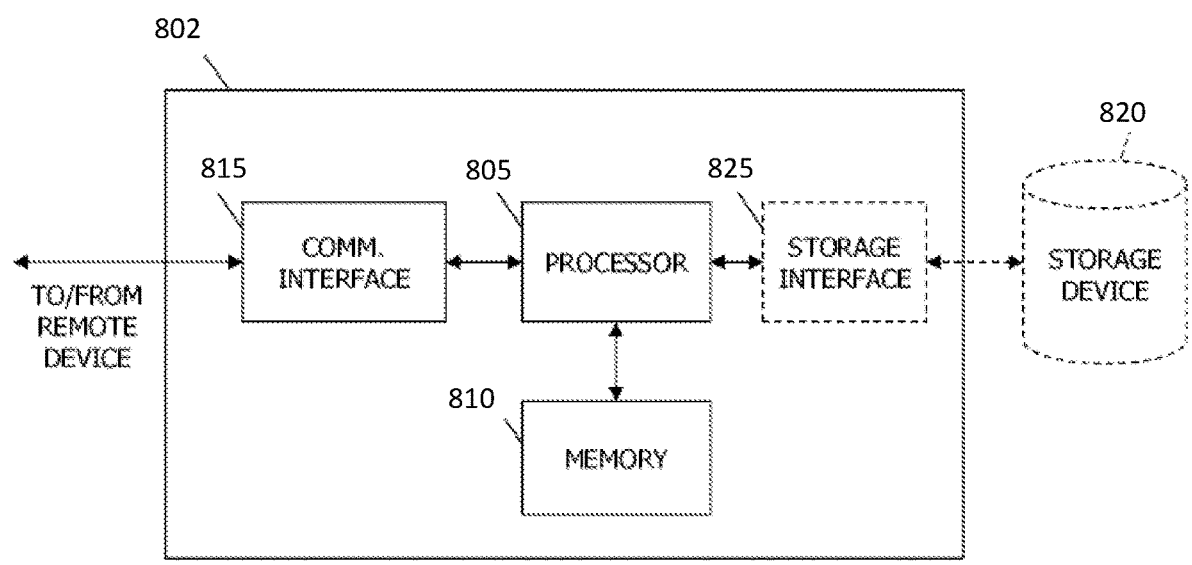
FIG. 8 is a simplified block diagram illustrating an exemplary configuration of a server computing device that may be used in the system shown in FIG. 7.

FIG. 8 depicts an exemplary configuration of a server computing device 802. Server computing device 802 may include, for example, agricultural transaction computing device 702, shown in FIG. 7. Additionally or alternatively, server computing device 802 may include database server 704 (also shown in FIG. 7).

Server computing device 802 may include a processor 805 for executing instructions. Instructions may be stored in a memory area 810, for example. Processor 805 may include one or more processing units (e.g., in a multi-core configuration). Memory 810 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Processor 805 may be operatively coupled to a communication interface 815 such that server computing device 802 may be capable of communicating with a remote device, such as the producer computing device 710 or the purchaser computing device 706 (shown in FIG. 7). For example, communication interface 815 may receive user input from the remote device via the Internet.

Processor 805 may also be operatively coupled to at least one storage device 820. Each storage device 820 may be any computer-operated hardware suitable for storing and/or retrieving data. In some embodiments, at least one storage device 820 may be integrated in server computing device 802. For example, server computing device 802 may include one or more hard disk drives as storage device 820. In other embodiments, at least one storage device 820 may be external to server computing device 802 and may be accessed by a plurality of server computing devices 802. For example, storage device 820 may include multiple storage units, such as hard disks or solid state disks in a redundant array of inexpensive disks (RAID) configuration. Storage device 820 may include a storage area network (SAN) and/or a network attached storage (NAS) system.

In some embodiments, processor 805 may be operatively coupled to the at least one storage device 820 via at least one storage interface 825. Storage interface 825 may be any component capable of providing processor 805 with access to storage device 820. Storage interface 825 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 805 with access to storage device 820.

Figure 9:
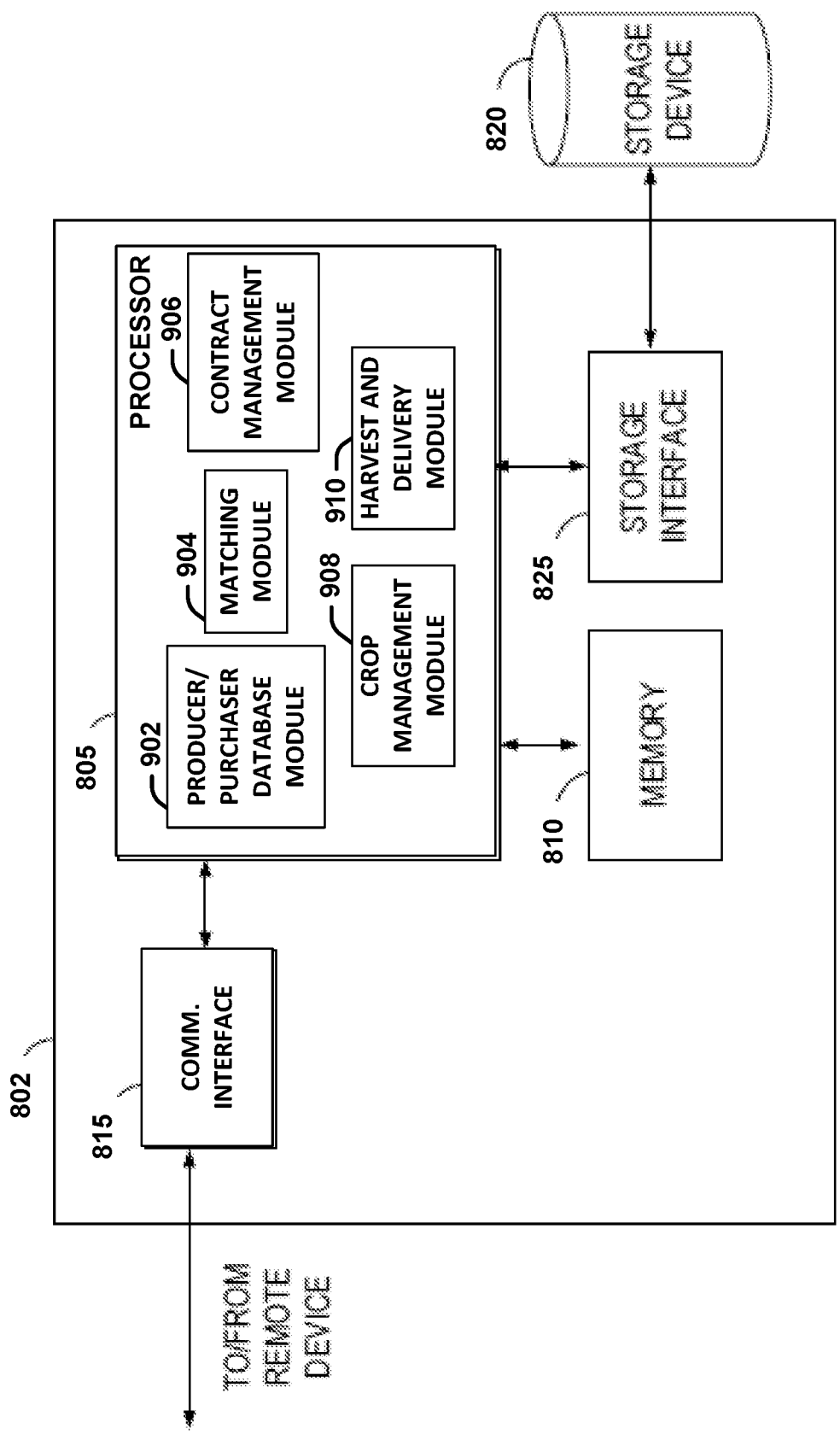
FIG. 9 is a simplified block diagram illustrating an exemplary agricultural transaction system that may be used to implement the methods shown in FIGS. 1-6.

Corresponds to FIG. 9

FIG. 9 depicts an example configuration of the computing device 802 illustrated in FIG. 8, including a processor 805 for executing instructions. The computing device 802 may be used to implement the agricultural transaction computing device 702 (shown in FIG. 7). Instructions are stored in a memory area 810, for example. Processor 805 includes one or more processing units (e.g., in a multi-core configuration), and is operable to execute a producer/purchaser database module 902, a matching module 904, a contract management module 906, a crop management module 908, and a harvest delivery module 910. Modules 902, 904, 906, 908, and 910 may include specialized instruction sets, coprocessors, and/or kernel extensions.

The producer/purchaser database module 902 is configured to receive data associated with each purchase request received from each of the at least one purchaser computing devices 706 and to receive additional data associated with each production offer received from each of the at least one producer computing devices 710 in one aspect. In various aspects, the producer/purchaser database module 902 is further configured to encrypt and decrypt data to maintain the anonymity of all producers and purchasers from one another. In some aspects, the producer/purchaser database module 902 is configured to query a potential producer or purchaser for the data defining a production offer or a purchase request using any known method without limitation.

By way of non-limiting example, data may be obtained from the purchaser or producer computing devices 706/710 using at least one control of a graphical user interface enabled by an app 708/712, respectively, resident on computing devices 706/710. The user may manipulate one or more controls, including, but not limited to, a text entry field, a slider, and/or any other suitable user interface (UI) controls, to enter the data using the apps 708/712. The UI may include one or more guides or examples to assist the user in accurately and/or precisely entering data. UI may further include one or more graphical indicators that display, in a dynamic fashion, the results of the user input.

In some aspects, the producer/purchaser database module 902 is configured to encrypt and decrypt data based on public and/or private keys. For example, certain data may be encrypted using a RSA (Rivest-Shamir-Adelman) encryption public key associated with a financial services provider or other third-party data source. In another example, data in other data sources may be encrypted using AES (Advanced Encryption Standard) encryption. In some embodiments, the producer/purchaser database module 902 includes specialized processor instructions configured to encrypt/decrypt data. In another embodiment, the producer/purchaser database module 902 may include an encryption/decryption optimized coprocessor connected to processor 805.

In other aspects, the matching module 904 is configured to compare the parameters of each purchase request and each production offer and to identify at least one match according to at least one match rule as described above. In addition, the matching module 904 is configured to identify a selected match from the at least one match according to a business rule as described previously. In some aspects, the at least one match rule and the at least one business rule may be stored and retrieved from the memory 810 or from the remote storage device 820.

In additional aspects, the contract management module 906 is configured to generate a purchase contract for each selected match determined by the matching module, and to administer the contract according to standard practice of agricultural purchase contracts, without limitation. In one aspect, the contract management module 906 may request confirmations of the purchase contract via the purchaser and producer computing devices 706/710. In another aspect, the contract management module 906 may collect and disperse payments from the purchaser to the producer according to a predetermined payment schedule defined by the purchase contract. By way of non-limiting example, the predetermined payment schedule may include partial payments for a variety of events including, but not limited to, an initial deposit, progress payments for milestones such as initial planting, fertilization events, harvest, confirmation of crop quality, and delivery of the crop. In this other aspect, the computing device 802 may communicate with a computing devices or servers operated by third-party entities including, but not limited to, financial services providers such as John Deere Finance or Amber Road.

In other additional aspects, the crop management module 908 is configured to monitor the process of planting, growing, harvesting, and delivering the crops in accordance with the purchase contract. In various aspects, the crop management module 908 receives data pertaining to the initial field preparation, planting, irrigation, fertilization, pesticide treatment, plant health, and crop characteristics over the planting, growth, harvest, storage, and/or delivery of the crop to the purchaser. In one aspect, the crop management module 908 may receive data in the form of images and/or documents received from the producer computing device 710. In another aspect, the crop management module 908 may receive data from one or more computing devices or servers operated by one or more third-party agriculture management providers including, but not limited to Farmlogs and Precision Planting. In some aspects, the data may be received in conjunction with one of the events described above, such as planting, pesticide application, and the like. In other aspects, the data may be received according to a predetermined schedule including, but not limited to, daily, weekly, monthly, and any other suitable interval.

In yet other additional aspects, the harvest and delivery module 910 is configured to manage the harvest and delivery of the crops by the producer according to the purchase contract. In some aspects, the harvest and delivery module 910 is configured to receive a harvest date and/or data characterizing the quality of the crop including, but not limited to, moisture content, seed weight, protein/carbohydrate/oil content, and any other suitable data characterizing crop quality from the producer computing device 710. In some aspects, the harvest and delivery module 910 is configured to transmit the harvest date and/or crop quality data to the purchaser computing device 706. In other aspects, the harvest and delivery module 910 may determine a delivery date and transmit the delivery date to the purchaser/producer computing devices 706/710. In an aspect, the delivery date may be based on the production contract and/or the crop quality data. In other aspects, the harvest and delivery module 910 receives a confirmation that the crop was delivered according to the production contract from the purchaser and/or producer computing devices 706/710.

Processor 805 is operatively coupled to a first communication (i.e., network) interface 815. In some embodiments, network interface 815 is configured to communicate with remote device(s) such as purchaser/producer computing devices 706/710 (shown in FIG. 7). In some embodiments, network interface 815 is a virtual interface. In certain embodiments, network interface 815 is associated with a respective network address, such as an IP ("internet protocol") address. In other embodiments, network interface 815 is associated with physical network links. For example, network interface 815 may receive network packets from remote devices via Ethernet, using a switching device. Network interface 815 may include a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)). Network interface 815 may be configured to transmit queries and/or receive responses.

Processor 805 is operatively coupled to a storage device 820. Storage device 820 is any computer-operated hardware suitable for storing and/or retrieving data. In some embodiments, storage device 820 is integrated in server computing device 802. For example, server computing device 802 may include one or more hard disk drives as storage device 820. In other embodiments, storage device 820 is external to server computing device 802 and is remotely accessed by server computing device 802. For example, storage device 820 may include multiple storage units such as hard disks or solid state disks in a redundant array of inexpensive disks (RAID) configuration, or may include a storage area network (SAN) and/or a network attached storage (NAS) system. Storage device 820 may include cache and/or other data sources.

In some embodiments, processor 805 is operatively coupled to storage device 820 via a storage interface 825. Storage interface 825 is any component capable of providing processor 805 with access to storage device 820. Storage interface 825 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 805 with access to storage device 820.

Memory area 810 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 10:
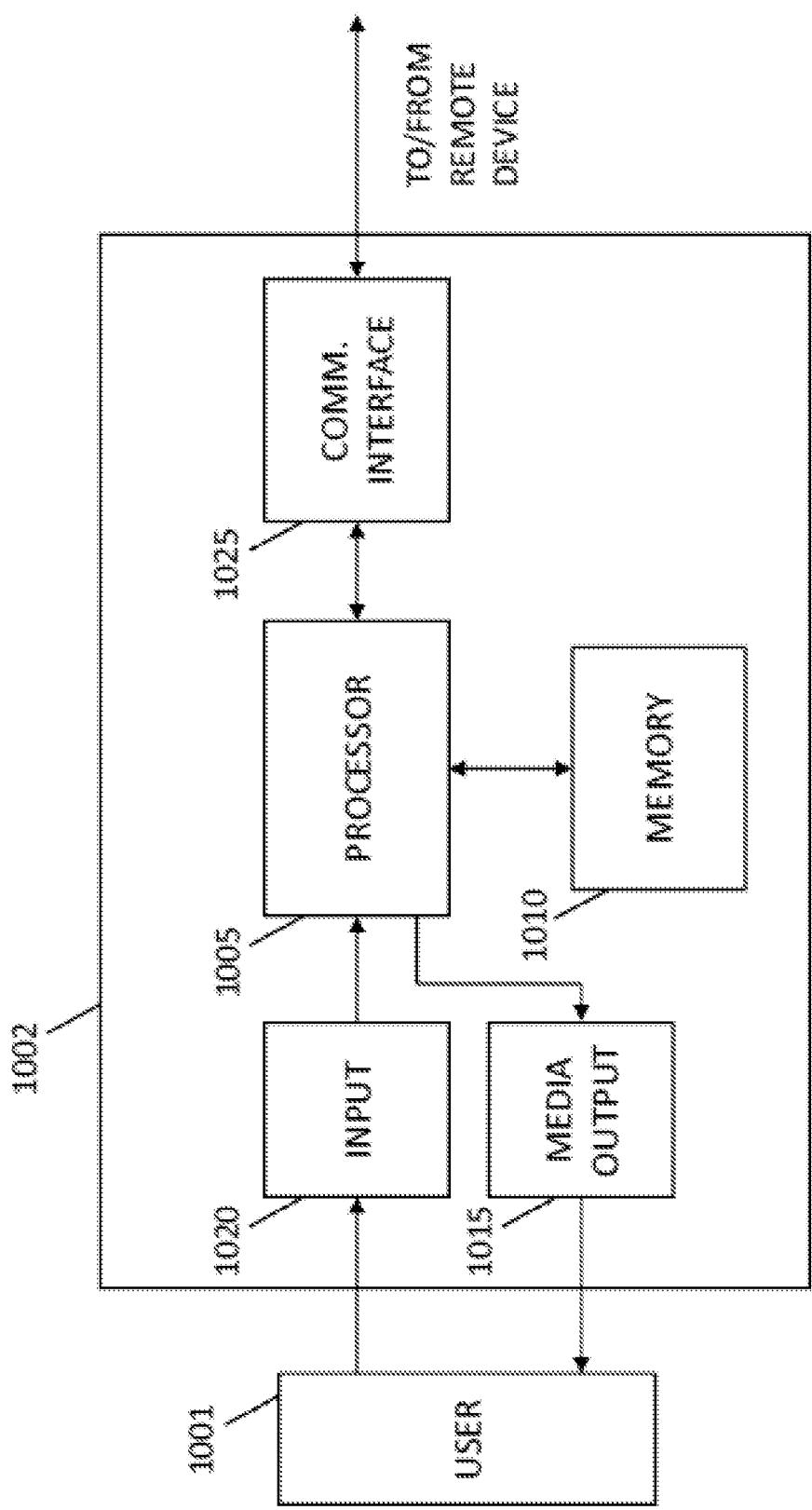
FIG. 10 is a simplified block diagram illustrating an exemplary user computing device that may be used to implement the methods shown in FIGS. 1-6.

FIG. 10 depicts a schematic view of an exemplary user computing device 1002, corresponding to various users including, but not limited to a purchaser/producer computing devices 706/710 (shown in FIG. 7). User computing device 1002 may be configured to implement a software application in embodiments of the method described above with respect to FIGS. 1-6 to communicate user input to a home agricultural transaction computing device 702 (shown in FIG. 7) and receive output therefrom for display at the user computing device 1002. In one embodiment, user computing device 1002 may be any device capable of interconnecting to the Internet including a mobile computing device or "mobile device," such as a smartphone, a personal digital assistant (PDA), a tablet, a wearable device (e.g., a "smart watch" or a personal projection device such as "smart glasses"), smart contact lenses, a "phablet," or other web-connectable equipment or mobile devices. In some embodiments, user computing device 1002 may be a non-mobile device, such as a desktop computer device.

User computing device 1002 may include a processor 1005 for executing instructions. Instructions may be stored in a memory area 1010, for example. Processor 1005 may include one or more processing units (e.g., in a multi-core configuration). Memory 1010 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

In some embodiments, processor 1005 may be operatively coupled to a media output device 1015, also referred to as a display device 1015. Display device 1015 may be any component capable of conveying information to a user 1001. In some embodiments, display device 1015 may include an output adapter such as a video adapter and/or an audio adapter operatively coupled to processor 1005. Display device 1015 may include, for example, a liquid crystal display (LCD), organic light emitting diode (OLED) display, cathode ray tube (CRT), or "electronic ink" display and/or an audio output device (e.g., a speaker or headphones). In some embodiments, display device 1015 may be configured to present the software application ("app") or web browser through which the agricultural transaction platform is accessed, in embodiments of the method described above with respect to FIGS. 1-6.

In some embodiments, processor 1005 may be operatively coupled to an input device 1020 configured to receive user input from user 1001. Input device 1020 may include, for example, a touch sensitive panel (e.g., a touch pad or a touch screen), a keyboard, a pointing device, a mouse, a stylus, a camera, a gyroscope, an accelerometer, a position detector, and/or an audio input device. It should be understood that in some embodiments, a single component such as a touch screen may function as both display device 1015 and input device 1020. In one example embodiment, the user application may accept "screen tap", "drop and drag", text entry, and/or any other input from user 1001 via input device 1020.

Processor 1005 may be operatively coupled to a communication interface 1025 such that user computing device 1002 may be capable of communicating with a remote device, such as a server computer device 802 (shown in FIG. 8). For example, communication interface 1025 may communicate with the server device 802 via a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

In certain embodiments, the agricultural transaction computing device may store data associated with one or more purchase requests, production offers, matches associated with the purchase requests and production offers and production contracts associated with the matches.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, external database, and/or third-party data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, a processing element may be trained by providing it with a large sample of images and/or user data with known characteristics or features.

Based upon these analyses, the processing element may learn how to identify characteristics and patterns that may then be applied to analyzing production offers, purchase requests, matches, purchase contracts, and/or other data. For example, the processing element may learn, with the user's permission or affirmative consent, to identify mutual features or characteristics of production offers and purchase requests that that are most likely to result in a more advantageous production contract for the producer, purchaser, and/or facilitator using the agricultural transaction computing device.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAIVI) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. An agricultural transaction computing device for facilitating at least one transaction between at least one producer of an agricultural product and at least one purchaser of the agricultural product, the agricultural transaction computing device communicatively coupled to a plurality of data sources including at least one producer computing device and at least one purchaser computing device, the producer computing device including a camera, the agricultural transaction computing device comprising a processor in communication with a memory device, the processor programmed to:
 receive, from each of the at least one purchaser computing devices, a purchase request, the purchase request comprising at least one purchase parameter selected from a delivery date, a crop type, at least one crop characteristic, an amount of crop, a purchase price, and a purchaser location, the purchase request generated in response to a first data entry via a first graphical user interface (GUI) enabled by a first application executing on each of the at least one purchaser computing devices;
 receive, from each of the at least one producer computing devices, a production offer, the production offer comprising at least one offer parameter selected from a harvest date, an acreage, at least one soil characteristic, a producer location, a planting capability, a storage capability, a transportation capability, and an offer price, the production offer generated in response to a second data entry via a second GUI enabled by a second application executing on each of the at least one producer computing device;
 compare each purchase request to each production offer to determine at least one match according to at least one match rule, each match comprising one purchase request received from one of the at least one purchaser computing devices and one production offer received from the at least one producer computing devices;
 identify a selected match from the at least one matches according to a business rule, the selected match comprising a selected purchase request and a selected production offer;
 generate a purchase contract comprising the purchase price, the amount of crop, and the delivery date;
 transmit, to the purchaser computing device associated with the selected match, the purchase contract to display the purchase contract via the first GUI;
 generate a sale contract comprising the offer price, the amount of crop, the crop type, the at least one crop characteristic, the delivery date, and the purchaser location;
 transmit, to the producer computing device associated with the selected match, the sale contract to display the sale contract via the second GUI;
 receive, from the purchaser computing device associated with the selected match, a purchaser consent to the purchase contract, the purchaser consent generated in response to a third data entry via the first GUI;
 receive, from the producer computing device associated with the selected match, a producer consent to the sale contract, the producer consent generated in response to a fourth data entry via the second GUI;
 generate, in response to the purchaser consent and the producer consent, a message to initiate crop production and a message to confirm crop production;
 transmit, to the producer computing device associated with the selected match, the message to initiate crop production to display the message via the second GUI;
 transmit, to the purchaser computing device associated with the selected match, the message to confirm crop production to display the message via the first GUI;
 receive, via the first application executing on the producer computing device, in response to input from a user associated with the producer computing device, a photograph taken using the camera of the producer computing device, the photograph indicating that crop production is proceeding;
 receive, from the producer computing device, the photograph;
 determine that crop production is proceeding based on the photograph;
 in response to determining that crop production is proceeding, transmit, to the purchaser computing device, the photograph and a confirmation that crop production is proceeding to cause the purchaser computing device to display the photograph and the confirmation via the first GUI; and
 manage the crop production using a machine learning program, the machine learning program trained by inputting sample data sets into the machine learning program, the sample data sets including at least the photograph, and utilizing deep learning algorithms focused on pattern recognition of the crop production.

2. The agricultural transaction computing device of claim 1, wherein the processor is further programmed to:
 transmit, to the producer computing device associated with the selected match, a request for a crop status, the crop status comprising a crop health, and an estimated harvest date; and
 transmit, to the purchaser computing device associated with the selected match, the crop status.

3. The agricultural transaction computing device of claim 1, wherein the processor is further programmed to:
 receive, from the producer computing device associated with the selected match, a confirmation of the harvest date and an estimated crop status at harvest; and
 transmit, to the purchaser computing device associated with the selected match, the delivery date and the estimated crop status at harvest.

4. The agricultural transaction computing device of claim 1, wherein the at least one match rule comprises at least one of:
 the purchase price is greater than the offer price;
 the producer location is within a suitable distance of the purchaser location;
 the acreage is sufficiently large to produce the amount of crop;
 the at least one soil characteristic is capable of producing the at least one crop characteristic;
 the harvest time is before the delivery date; and the transportation capability is sufficient to transport the amount of crop from the producer location to the purchaser location by the delivery date.

5. The agricultural transaction computing device of claim 1, wherein the at least one business rule comprises at least one of:
   a maximum difference between the purchase price and the offer price; and
   at least one of a suitable credit history, customer satisfaction record, and active commercial relationship with suppliers of agricultural supplies.

6. A computer-implemented method for facilitating at least one transaction between at least one producer of an agricultural product and at least one purchaser of the agricultural product, the method implemented using an agricultural transaction computing device communicatively coupled to a plurality of data sources including at least one producer computing device and at least one purchaser computing device, the producer computing device including a camera, the agricultural transaction computing device including a processor in communication with a memory device, the method comprising:
   receiving, from each of the at least one purchaser computing devices, a purchase request, the purchase request comprising at least one purchase parameter selected from a delivery date, a crop type, at least one crop characteristic, an amount of crop, a purchase price, and a purchaser location, the purchase request generated in response to a first data entry via a first graphical user interface (GUI) enabled by a first application executing on each of the at least one purchaser computing devices;
   receiving, from each of the at least one producer computing devices, a production offer, the production offer comprising at least one offer parameter selected from a harvest date, an acreage, at least one soil characteristic, a producer location, a planting capability, a storage capability, a transportation capability, and an offer price, the production offer generated in response to a second data entry via a second GUI enabled by a second application executing on each of the at least one producer computing device;
   comparing each purchase request to each production offer to determine at least one match according to at least one match rule, each match comprising one purchase request received from one of the at least one purchaser computing devices and one production offer received from the at least one producer computing devices;
   identifying a selected match from the at least one matches according to a business rule, the selected match comprising a selected purchase request and a selected production offer;
   generating a purchase contract comprising the purchase price, the amount of crop, and the delivery date;
   transmitting, to the purchaser computing device associated with the selected match, the purchase contract to display the purchase contract via the first GUI;
   generating a sale contract comprising the offer price, the amount of crop, the crop type, the at least one crop characteristic, the delivery date, and the purchaser location;
   transmitting, to the producer computing device associated with the selected match, the sale contract to display the sale contract via the second GUI;
   receiving, from the purchaser computing device associated with the selected match, a purchaser consent to the purchase contract, the purchaser consent generated in response to a third data entry via the first GUI;
   receiving, from the producer computing device associated with the selected match, a producer consent to the sale contract, the producer consent generated in response to a fourth data entry via the second GUI;
   generating, in response to the purchaser consent and the producer consent, a message to initiate crop production and a message to confirm crop production;
   transmitting, to the producer computing device associated with the selected match, the message to initiate crop production to display the message via the second GUI;
   transmitting, to the purchaser computing device associated with the selected match, the message to confirm crop production to display the message via the first GUI;
   receiving, via the first application executing on the producer computing device, in response to input from a user associated with the producer computing device, a photograph taken using the camera of the producer computing device, the photograph indicating that crop production is proceeding;
   receiving, from the producer computing device, the photograph;
   determining that crop production is proceeding based on the photograph;
   in response to determining that crop production is proceeding, transmitting, to the purchaser computing device, the photograph and a confirmation that crop production is proceeding to cause the purchaser computing device to display the photograph and the confirmation via the first GUI; and
   managing the crop production using a machine learning program, the machine learning program trained by inputting sample data sets into the machine learning program, the sample data sets including at least the photograph, and utilizing deep learning algorithms focused on pattern recognition of the crop production.

7. The computer-implemented method of claim 6, further comprising:
   transmitting, to the producer computing device associated with the selected match, a request for a crop status, the crop status comprising a crop health, and an estimated harvest date; and
   transmitting, to the purchaser computing device associated with the selected match, the crop status.

8. The computer-implemented method of claim 6, further comprising:
   receiving, from the producer computing device associated with the selected match, a confirmation of the harvest date and an estimated crop status at harvest; and
   transmitting, to the purchaser computing device associated with the selected match, the delivery date and the estimated crop status at harvest.

9. The computer-implemented method of claim 6, wherein the at least one match rule comprises at least one of:
   the purchase price is greater than the offer price;
   the producer location is within a suitable distance of the purchaser location;
   the acreage is sufficiently large to produce the amount of crop;
   the at least one soil characteristic is capable of producing the at least one crop characteristic;
   the harvest time is before the delivery date; and
   the transportation capability is sufficient to transport the amount of crop from the producer location to the purchaser location by the delivery date.

10. The computer-implemented method of claim 6, wherein the at least one business rule comprises at least one of:
- a maximum difference between the purchase price and the offer price; and
- at least one of a suitable credit history, customer satisfaction record, and active commercial relationship with suppliers of agricultural supplies.

11. At least one non-transitory computer-readable storage medium having computer-executable instructions embodied thereon wherein, when executed by at least one processor of an agricultural transaction computing device communicatively coupled to a plurality of data sources including at least one producer computing device and at least one purchaser computing device, the producer computing device including a camera, the computer-executable instructions cause the at least one processor to:
- receive, from each of the at least one purchaser computing devices, a purchase request, the purchase request comprising at least one purchase parameter selected from a delivery date, a crop type, at least one crop characteristic, an amount of crop, a purchase price, and a purchaser location, the purchase request generated in response to a first data entry via a first graphical user interface (GUI) enabled by a first application executing on each of the at least one purchaser computing devices;
- receive, from each of the at least one producer computing devices, a production offer, the production offer comprising at least one offer parameter selected from a harvest date, an acreage, at least one soil characteristic, a producer location, a planting capability, a storage capability, a transportation capability, and an offer price, the production offer generated in response to a second data entry via a second GUI enabled by a second application executing on each of the at least one producer computing device;
- compare each purchase request to each production offer to determine at least one match according to at least one match rule, each match comprising one purchase request received from one of the at least one purchaser computing devices and one production offer received from the at least one producer computing devices;
- identify a selected match from the at least one matches according to a business rule, the selected match comprising a selected purchase request and a selected production offer;
- generate a purchase contract comprising the purchase price, the amount of crop, and the delivery date;
- transmit, to the purchaser computing device associated with the selected match, the purchase contract to display the purchase contract via the first GUI;
- generate a sale contract comprising the offer price, the amount of crop, the crop type, the at least one crop characteristic, the delivery date, and the purchaser location;
- transmit, to the producer computing device associated with the selected match, the sale contract to display the sale contract via the second GUI;
- receive, from the purchaser computing device associated with the selected match, a purchaser consent to the purchase contract, the purchaser consent generated in response to a third data entry via the first GUI;
- receive, from the producer computing device associated with the selected match, a producer consent to the sale contract, the producer consent generated in response to a fourth data entry via the second GUI;
- generate, in response to the purchaser consent and the producer consent, a message to initiate crop production and a message to confirm crop production;
- transmit, to the producer computing device associated with the selected match, the message to initiate crop production to display the message via the second GUI;
- transmit, to the purchaser computing device associated with the selected match, the message to confirm crop production to display the message via the first GUI;
- receive, via the first application executing on the producer computing device, in response to input from a user associated with the producer computing device, a photograph taken using the camera of the producer computing device, the photograph indicating that crop production is proceeding;
- receive, from the producer computing device, the photograph;
- determine that crop production is proceeding based on the photograph;
- in response to determining that crop production is proceeding, transmit, to the purchaser computing device, the photograph and a confirmation that crop production is proceeding to cause the purchaser computing device to display the photograph and the confirmation via the first GUI; and
- manage the crop production using a machine learning program, the machine learning program trained by inputting sample data sets into the machine learning program, the sample data sets including at least the photograph, and utilizing deep learning algorithms focused on pattern recognition of the crop production.

12. The at least one non-transitory computer-readable storage medium of claim 11 wherein the computer-executable instructions further cause the at least one processor to:
- transmit, to the producer computing device associated with the selected match, a request for a crop status, the crop status comprising a crop health, and an estimated harvest date; and
- transmit, to the purchaser computing device associated with the selected match, the crop status.

13. The at least one non-transitory computer-readable storage medium of claim 11 wherein the computer-executable instructions further cause the at least one processor to:
- receive, from the producer computing device associated with the selected match, a confirmation of the harvest date and an estimated crop status at harvest; and
- transmit, to the purchaser computing device associated with the selected match, the delivery date and the estimated crop status at harvest.

14. The at least one non-transitory computer-readable storage medium of claim 11 wherein the at least one match rule comprises at least one of:
- the purchase price is greater than the offer price;
- the producer location is within a suitable distance of the purchaser location;
- the acreage is sufficiently large to produce the amount of crop;
- the at least one soil characteristic is capable of producing the at least one crop characteristic;
- the harvest time is before the delivery date; and
- the transportation capability is sufficient to transport the amount of crop from the producer location to the purchaser location by the delivery date.

15. The at least one non-transitory computer-readable storage medium of claim 11, wherein the at least one business rule comprises at least one of:

a maximum difference between the purchase price and the offer price; and at least one of a suitable credit history, customer satisfaction record, and active commercial relationship with suppliers of agricultural supplies.

* * * * *